UNITED STATES PATENT OFFICE.

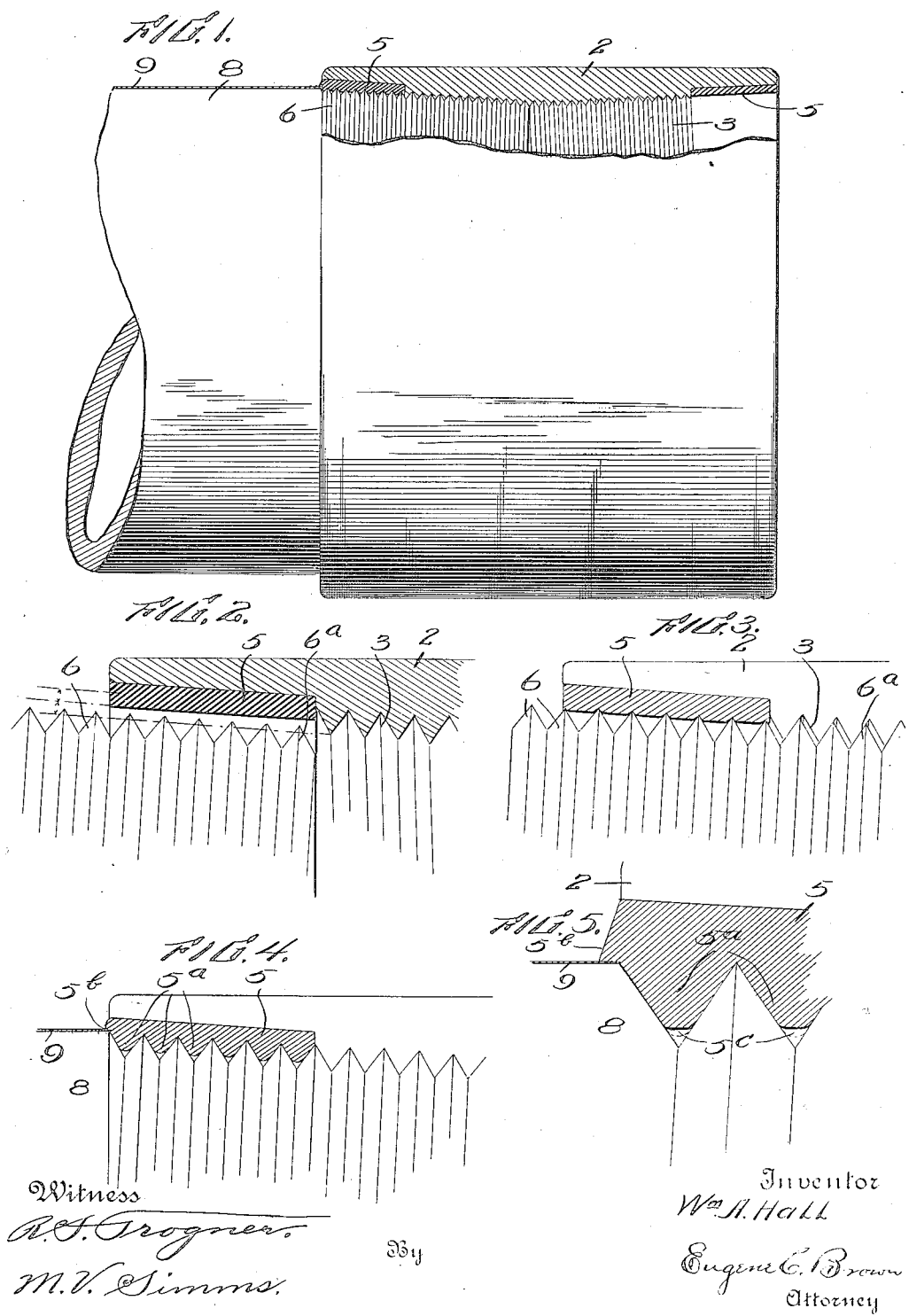

WILLIAM A. HALL, OF NEW YORK, N. Y.

PIPE-COUPLING.

1,168,196.   Specification of Letters Patent.   Patented Jan. 11, 1916.

Application filed November 17, 1915. Serial No. 61,990.

*To all whom it may concern:*

Be it known that I, WILLIAM A. HALL, a citizen of the United States, residing at New York, in the county of New York and State of New York, have invented certain new and useful Improvements in Pipe-Couplings, of which the following is a specification.

My invention relates to pipe couplings used to connect the ends of metal pipes and while these couplings are more especially intended to join the sections of conduits for electric conductors, they may also be applied to other purposes.

The object of my invention is to provide a coupling having a member of soft metal or other plastic material into which the inner portion of the threads on the end of the pipe will be embedded as the pipe is screwed into the coupling to thereby form a fresh and absolutely moisture-proof seal.

The insulated electric conductors or cables in all recent installations in buildings are required to be inclosed in metal pipes which are enameled, galvanized, "sherardized" or otherwise covered or coated to prevent oxidation or rust. These pipes are shipped from the factory in standard sections and are cut into the required lengths by the mechanics at the place of installation. In order to connect the sections the ends of the pipe or conduit are threaded so that they may be screwed into the usual internally threaded union or coupling members. During this threading operation the enamel or other coating is necessarily removed, leaving the threaded ends unprotected, and when they are screwed into the couplings, rust or corrosion soon follows along the bare metal threads rapidly destroying the pipe. This has been the source of much difficulty in electric conduit installations. It has been proposed to employ a lead gasket which may be forced into an annular space between the pipe and the coupling, as in patent to Clemens, No. 437,019; or to provide a lead portion adjacent the mouth of the coupling upon either end which is first threaded to form a continuation of the inner threads of the main body of the coupling and which may be calked or upset against the pipe, as in patent to Miles No. 272,574 or Booth No. 659,336. I have found that it is necessary to have a freshly formed surface in contact with the threads of the pipe, or in other words, to have the pipe threads embed themselves in the lead or plastic surface by cutting progressively deeper therein during the operation of screwing the pipe into the coupling member. This result is not attained in the case of couplings having soft metal parts that have been previously threaded.

My invention will be understood from the following detailed description in connection with the accompanying drawings, in which—

Figure 1 is a side elevation, partly in section, of a coupling member embodying my invention; Figs. 2 to 4 are detail views illustrating the steps in my method of forming the moisture-proof union or joint between the pipe and the soft metal or plastic sealing portion of the coupling; and Fig. 5 is an enlarged detail view of the same.

The coupling member is of the standard design, the tubular body 2 being provided as usual with internal screw threads 3, which flare outwardly from the middle toward the counterbored ends. Within the counterbored annular recesses I secure in any suitable manner, as by molding, a ring 5 of a soft ductile metal or metal compound, such as lead, or other suitable plastic substance, forming it of such thickness that it will extend inwardly to about one-half the depth of the threads, as illustrated in Fig. 2. The inner periphery of the ring 5, preferably flares outwardly at substantially the same angle as that of the threaded portion, the internal diameter of the outer end being substantially the same or slightly less than the external diameter of the pipe. It is evident that the wall of the annulus need not be of a uniform thickness and that it is not necessary for its inner periphery to flare, as it may be of uniform diameter throughout.

The ends 6 of the pipes or conduits 8 are threaded and tapered to correspond with the internally threaded coupling member. As the internal diameter of the soft metal annulus or ring 5, is greater than the larger or outer end of the threaded part of the coupling, the threads on the tapered end of the pipe will not contact with the ring until the forward threads 6ª engage the outer threads 3. In Fig. 2, I have shown the forward end of the pipe passing the ring 5, and in Fig. 3, the manner in which the remaining threads begin to cut into the soft metal ring when the forward pipe threads have begun to mesh with the threads 3 of the coupling. As the pipe is screwed farther into the coupling the pipe threads cut progressively deeper into the annulus and force the soft metal inwardly between the threads of the pipe as indicated at $5^a$ in Figs. 4 and 5. The metal at the outer end will also be squeezed or extruded, as at $5^b$, thereby forming a tight joint overlapping the coating 9 on the pipe and effectually sealing all of the bare metal of the threaded portion of the pipe against moisture and absolutely preventing oxidation or rust. Each fractional turn of the pipe causes the threads to cut deeper and forces the soft metal farther into the recesses between the threads as I have indicated at $5^c$ in Fig. 5.

From the above description it will appear that my method of forming an air, gas moisture- and vapor-proof joint or seal between the threaded internal wall of a coupling member and the threaded end of a pipe comprises the forming of a fresh thread in the soft metal annulus by the cutting action of the threads of the pipe as it is screwed into the threads in the interior wall of the body of the coupling and bringing the outer end of the annulus into intimate contact with the coating on the pipe. The depth to which the threads of the pipe are embedded in the soft metal can be varied by increasing or decreasing the flare of the inner periphery of the annulus.

I have described in detail the particular construction illustrated in the accompanying drawings for the purpose of definitely disclosing an embodiment of my invention, but I am aware that various changes can be made therein within the scope of the appended claims and without in any manner departing from the spirit of my invention.

I claim:—

1. A pipe coupling having a body provided with an internally threaded portion and an annulus of material softer than said body secured within the same upon either side of said threaded portion, said annulus having a smooth inner surface and having an inner diameter intermediate the inner and outer diameters of the adjacent thread.

2. A pipe coupling, comprising a tubular metal body having internal screw threads through the intermediate portion and counterbored ends, and an annulus of softer metal within each counterbored part having a smooth inner surface and an inner diameter greater than the inner diameter of the adjacent thread.

3. A pipe coupling, comprising a tubular member provided with an internally screw threaded portion flaring from the center outwardly in both directions and having counterbored ends, and an annulus of softer material than said member secured in each of said counterbored portions, said annulus having its smallest internal diameter greater than the internal diameter of the adjacent threads, whereby a threaded pipe tapered to correspond with said flaring threaded portion will cut into said annulus.

4. The method of forming a sealed joint between an externally coated pipe having a threaded end and an internally threaded coupling member, which comprises the inserting of an annulus of softer material than the pipe within the bore of the coupling at the end thereof, and threading the pipe into the coupling until the pipe threads cut into said softer material and the pipe coating is brought into intimate contact with the outer periphery of said material.

5. The method of forming a sealed joint between an externally coated pipe having a threaded end and an internally threaded coupling member, which comprises the inserting of an annulus of softer material than the pipe within the bore of the coupling at the end thereof, and threading the pipe into the coupling until the pipe threads cut into said softer material and force the outer end of the soft material to flow outwardly into contact with the coating on the pipe.

In testimony whereof I affix my signature in presence of two witnesses.

WILLIAM A. HALL.

Witnesses:
B. G. KODYHAUFF,
OLIVER R. GRANT.